Jan. 11, 1966   F. B. McCARTY   3,229,137

INDUCTION MACHINE ROTOR

Filed Dec. 3, 1962   4 Sheets-Sheet 1

INVENTOR.
FREDERICK B. McCARTY
BY
*Robert C. Brown*
ATTORNEY

Jan. 11, 1966  F. B. McCARTY  3,229,137
INDUCTION MACHINE ROTOR
Filed Dec. 3, 1962  4 Sheets-Sheet 3

INVENTOR.
FREDERICK B. McCARTY
BY
ATTORNEY

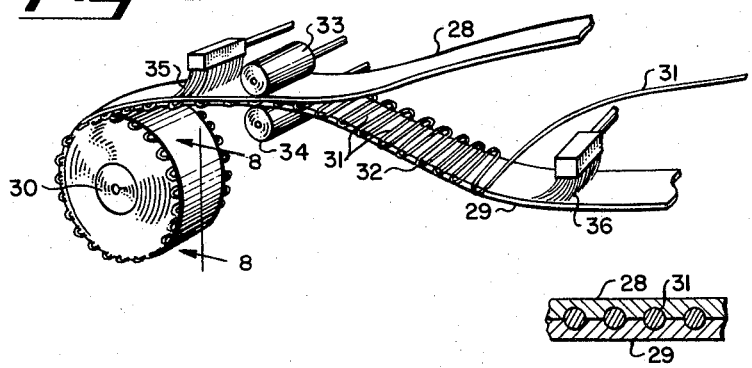
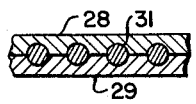
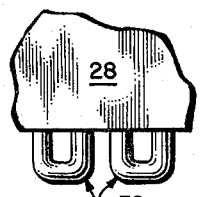
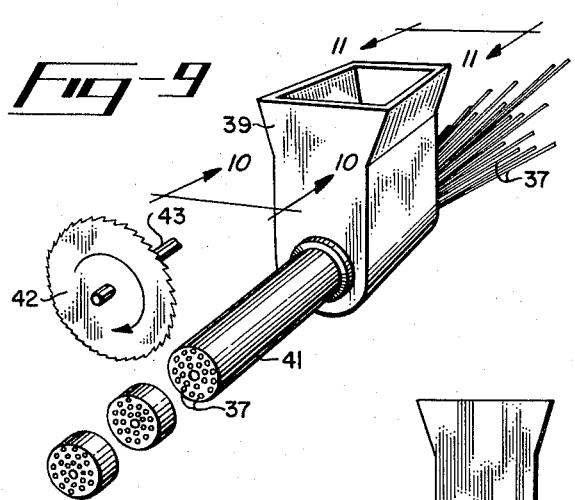
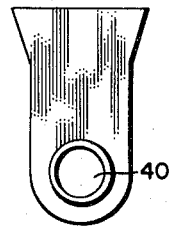
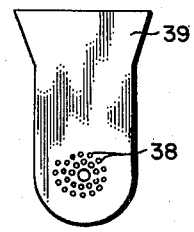
INVENTOR.
FREDERICK B. McCARTY

United States Patent Office

3,229,137
Patented Jan. 11, 1966

3,229,137
INDUCTION MACHINE ROTOR
Frederick B. McCarty, Eastview, Calif., assignor to Aerojet-General Corporation, Azusa, Calif., a corporation of Ohio
Filed Dec. 3, 1962, Ser. No. 241,940
2 Claims. (Cl. 310—268)

This invention relates to dynamo-electric machines of the induction type such as induction motors and generators. An object of the invention is to provide such machines capable of high performance and capability and long life which can be built in a relatively small size and low weight and at low cost.

Induction machines such as the well known induction motor or generator are well known in the art. They commonly comprise a stator and a rotor mounted on a shaft which rotates relative to the stator. A well known form of induction motor comprises a rotor in the form of a so-called squirrel cage having electrically conductive elements related to a core of magnetic material; and a stator in proximity to the rotor, comprising a core of magnetic material with a stator winding. When alternating voltage is applied to the stator winding, the resulting current through the stator sets up a corresponding magnetic field which passes through the magnetic material of the rotor and induces currents in the electric conductors of the rotor in such a way as to cause the rotor to rotate in close correspondence with the frequency of the alternating voltage on the stator winding. Such a machine can also be operated as a generator by applying torque to turn the rotor and taking the generated alternating voltage from the stator winding.

In accordance with the present invention, there is provided an induction motor or generator, herein referred to as an induction machine, which is featured by a rotor spaced from the stator armature by an axial air gap. This axial air gap can be provided by use of a rotor in the form of a disc or the like having at least one of its sides juxtaposed to a stator core provided with an armature winding with a narrow axial air gap between the juxtaposed faces of the stator and the rotor.

A feature of the invention resides in a rotor element of electrical conductivity having passed through it in a substantially axial direction a multitude of parallel-arranged wires or the like of small diameter and closely spaced to each other. Thus a large bulk of the rotor element is composed of the spaced wires of magnetic material and a filling between them of the electrically conductive material which is non-magnetic. In consequence, the non-magnetic conducting material has currents generated in it, and thereby performs a function analogous to that of the squirrel cage of a conventional form of induction machine.

Induction machines according to this invention have many advantages of weight reduction and performance not possessed by conventional machines, as will more fully appear hereinafter.

The foregoing and other features of the invention will be better understood from the following detailed description and the accompanying drawings of which:

FIG. 2 is an end elevational view of the housing of the induction machine of FIG. 1 with the rotor and stators omitted for purposes of clarity;

FIG. 7 is a schematic perspective view showing a manner of making a rotor disc for an induction machine according to this invention;

FIG. 8 is a cross sectional view of part of a strip assembly taken at line 8—8 of FIG. 7;

FIG. 9 is a schematic perspective view showing another manner of making a rotor disc for an induction machine according to this invention;

FIG. 10 is an end elevational view of the hopper of FIG. 9 looking from line 10—10 of FIG. 9;

FIG. 11 is an end elevational view of the hopper of FIG. 9 looking from line 11—11 of FIG. 9; and FIG. 12 is a fragmentary elevational view showing the wire loop fabricated with flattened ends.

Figure 1:
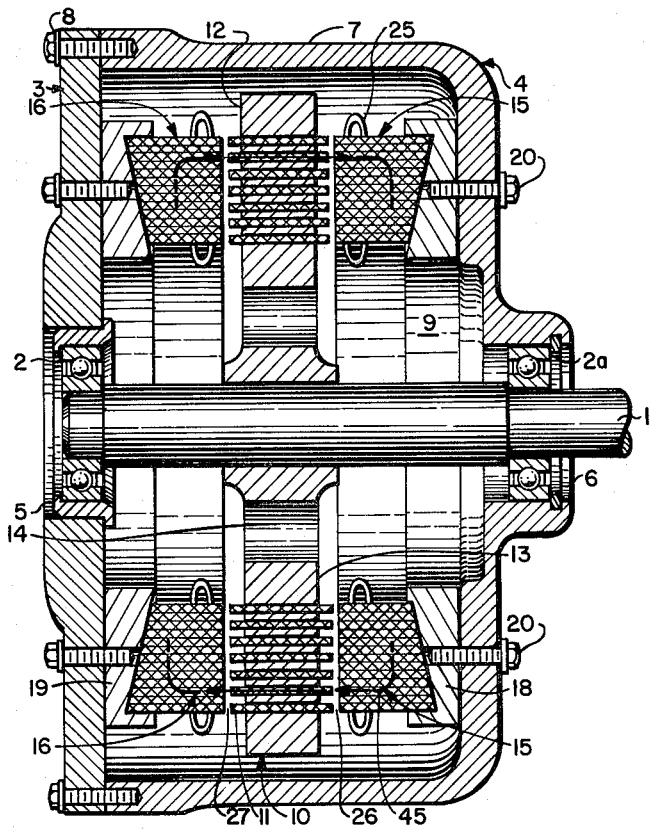
FIG. 1 is a longitudinal cross sectional view of an induction machine according to this invention.

Referring to the drawing, there is shown a dynamo-electric machine of the induction motor type comprising a shaft 1 mounted for rotation in bearings 2 and 2a fitted in frame members 3 and 4, respectively, which are of a non-magnetic metal. Frame member 3 is in the form of a circular plate or disc with a central opening 5 into which the bearing 2 is fitted. Frame member 4 is a cup-shaped member with a central opening 6 into which bearing 2a is fitted and having an outer cylindrical portion 7 which joins the outer periphery of plate 3 to which it is fastened as by bolts 8. The frame members 3, 4 thereby comprise a housing which forms an enclosure 9 within which the active elements of the induction machine are mounted.

Figure 3:
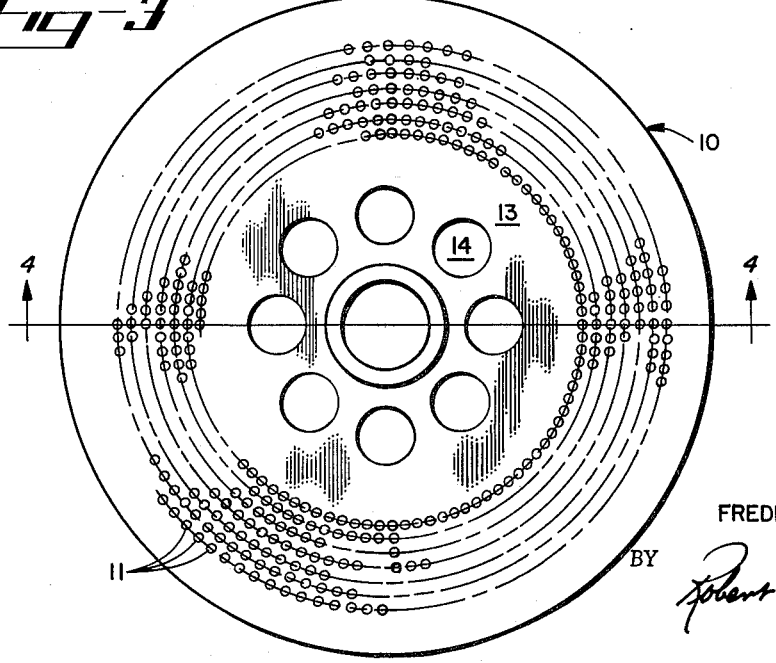
FIG. 3 is an end elevational view, partially schematic, of the rotor of the induction machine of FIG. 1.
Figure 4:
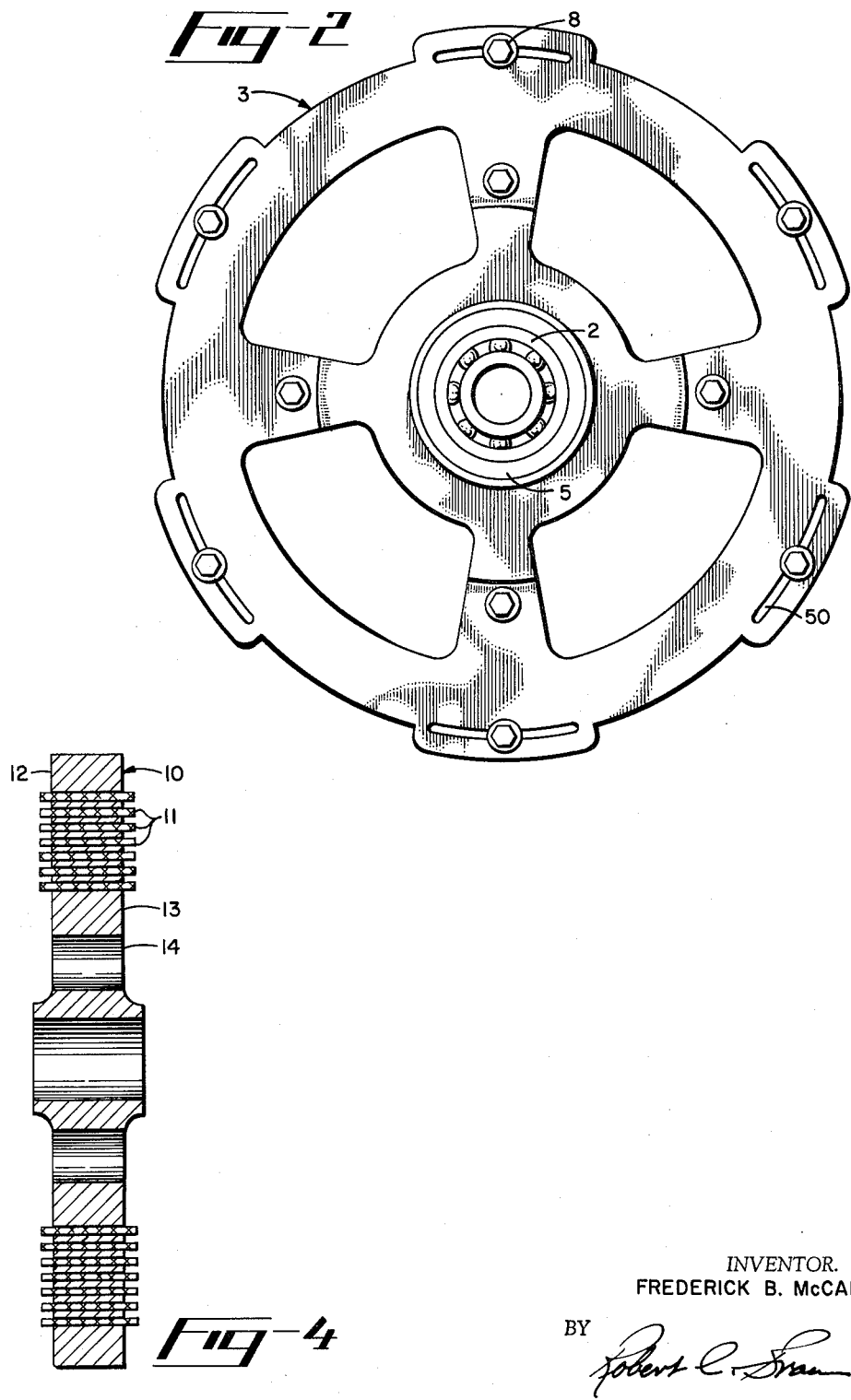
FIG. 4 is a cross sectional view of the rotor of FIG. 3 taken at line 4—4 of FIG. 3.

There is fixed on the shaft 1 within the housing a circular rotor disc 10 constructed as shown in FIGS. 3 and 4. In the drawing it will be understood that in the sectional views the portions represented by diagonal lines slanting in only one direction are composed of non-magnetic material, and that the portions represented by two sets of diagonal lines, one set of which slants in one direction while the other set slants in the other direction and intersects the first set of slant lines, are composed of magnetic material. Thus, the shaft 1 and the frame members 3, 4 comprising the housing are non-magnetic material; and the basic material of the rotor disc 10 is of a non-magnetic, but electrically conducting, material.

The rotor disc 10 is not entirely of non-magnetic material, however, as it contains a multitude of small rods 11 of magnetic material extending parallel to the shaft 1 and to each other and separated from each other by the non-magnetic material of the rotor disc 10. These rods 11 are arranged in a spiral array as viewed from the face of the disc, as shown in FIG. 3. The outer peripheral portion of the disc, at 12, does not contain any rods; and likewise the inner portion toward the shaft, at 13, does not contain any of these magnetic material rods. Furthermore, within this inner region 13 there are placed a number of holes 14 through the disc parallel to the shaft and equally spaced from each other. This will reduce the weight of the rotor.

Figure 5:
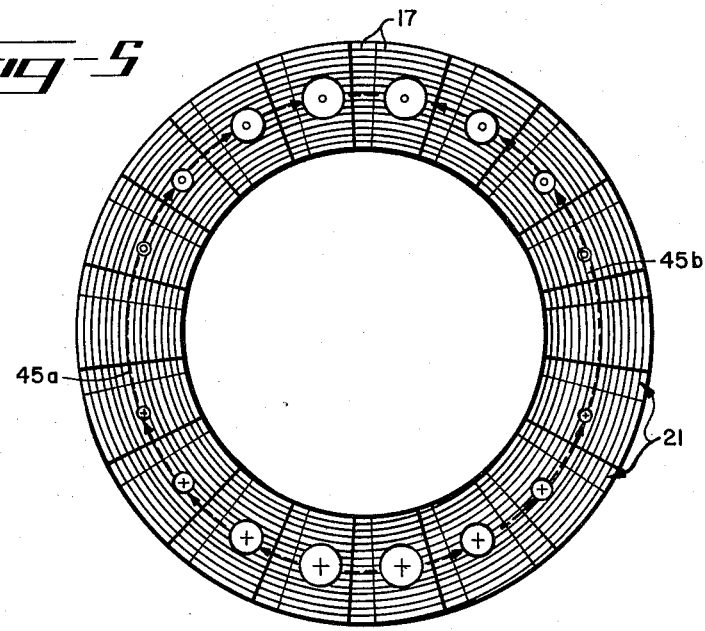
FIG. 5 is an end elevational view of a stator core used in the induction machine of FIG. 1.
Figure 6:
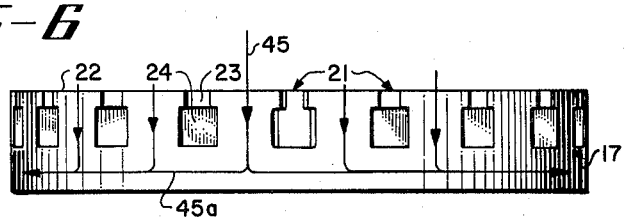
FIG. 6 is a plan view of the stator of FIG. 5.

Within the chamber 9 there are fixed two toroidal stator armatures 15 and 16, one on each side of the rotor disc. As shown in FIGS. 5 and 6, each armature has a core of magnetic material formed of laminations 17 of magnetic material, the laminations being tightly fitted together. Each armature core is preferably formed by winding a ribbon of the magnetic material in a tightly packed helix, the adjacent turns of which constitute the successive laminations. Each armature core is supported by a suitable support of non-magnetic material, the support for armature 15 being designated 18, and the support for armature 16 being designated 19. Each of these armature supports is of a generally toroidal shape and is fastened within the housing by suitable threaded screws 20. Each armature is fastened to its support in a suitable manner, as for example, welding or the like.

Each laminated armature core is provided with radial slots 21 along the face 22 of the core which faces, and which has a slight clearance from, the side of the rotor disc to which it is juxtaposed. These slots 21 are in the form of relatively narrow radially extending openings 23 which open up into enlarged radially extending openings 24 located further within the armature core. These core slots are for the purpose of supporting and containing armature windings 25. The turns of the windings are pushed through the entrance opening 23 and into the enlarged opening 24 so that each of the solts contains one or more convolutions of the winding. The particular type of winding is no part of the present invention, and the windings can be single-phase or multi-phase as desired; and since the art of winding armature cores is well understood, no further description is needed here.

The axial clearance, that is, the spaces 26 and 27 between each side of disc 10 and the respective stator core face, is made relatively small, while still allowing sufficient clearance for tolerances, so that there will be relatively little reluctance imposed in the magnetic circuit. This clearance may, for example, be about 10 mils. The clearance referred to is, of course, the clearance between the ends of rods 11 and the respective face of the stator core. It is not essential that the rods 11 protrude beyond the face of the non-magnetic conductive material of the disc; but it is preferable to have the rods protrude beyond the faces as shown because the rods serve as an effective heat exchanger, and act as a centrifugal fan which directs cooling air through the axial air gap for effective cooling.

When the machine is operated as a motor, alternating voltage is applied to the stator winding in a well-known manner. According to well-known induction motor theory, this has the effect of a rotating field which passes through the rotor disc. The magnetic flux may be considered to flow, for example, from a tooth of one of the stator cores such as 15, in the axial direction across the axial air gap 26 to the juxtaposed rod 11 (see flux line 45); then on through the rod to the other end thereof and across the axial air gap 27 to the juxtaposed tooth of stator core 16. From this position it splits and travels circumferentially both ways (flux lines 45a and 45b, FIGS. 5 and 6) around the back part of stator core 16 back of the slots, to another angular position of the stator, depending on the number of poles of the stator windings; then through the tooth at that point and back across the axial air gap 27 (flux line 45b) to and through the corresponding rods 11, across the axial air gap 26 to the corresponding tooth of stator 15 and then through the back part of stator 15 circumferentially around this stator to the original position to complete the magnetic circuit. Other similar flux lines (FIG. 6) could be drawn through the other teeth of the stators. The flux lines which have been illustrated are for a two-pole machine; but other numbers of poles could be used instead.

The magnetic circuit as just described passes through all the teeth of the stator core; and owing to the change of the current amplitude and direction in the stator winding from instant to instant in the alternating current cycle, the effect is to create a rotating magnetic field through the rotor disc. This has the effect of inducing currents in the non-magnetic but conductive part of the rotor disc between the rods 11 of magnetic material. These eddy currents through the rotor are analogous to those induced in the squirrel cage of an ordinary squirrel cage type of induction motor; and the magnitude of these eddy currents depends on the amount of slip, that is, the amount by which the rotor is rotating slower than the rotation of the magnetic field of the stator. The amount of the slip is dependent on the amount of load on the motor shaft 1; the greater the load, the greater being the slip, and the greater the amount of induced eddy currents in the non-magnetic, conductive, material of the rotor disc.

FIG. 7 illustrates the manner by which a rotor disc for use in the induction machine, may be made. A pair of strips 28 and 29 which may be pulled off of supply rolls (not shown) are wound on an arbor 30 having an outside diameter equal to the inside diameter which is desired for the rotor disc. These two strips are of a desired electrically conducting but non-magnetic material, such as aluminum or copper, and are of width equal to the desired width of the non-magnetic part of the rotor disc. The thickness of each of these strips may conveniently be about 60 mils. As the strips 28 and 29 are rolled together on the arbor, they have sandwiched between them an array of a wire 31 of magnetic material such as iron which may be pulled off a supply roll of the wire (not shown). As the strips 28 and 29 are rolled on the arbor, the wire 31 is looped back and forth across the width of the strips so that there are lengths 31 of the wire perpendicular to the lengths of the strips; and there are curved loops 32 of the wire which protrude slightly beyond the edges of the strips. The lengths 31 are close to, but do not touch each other. Although the precise diameter and spacing of the wire lengths are not critical, it will be convenient, for example, to use a wire of about 60 mils diameter and to space the adjacent lengths 31 about 120 mils apart center to center. Although it is possible to loop the wire 31 in its array between the strips 28 and 29, by hand, it will ordinarily be more convenient to do it automatically by some convenient mechanism (not shown).

Following the formation of the array of the continuous wire 31, the strips 28 and 29 with the wire array interleaved between them is passed between rolls 33 and 34 which are pressed toward each other under sufficient pressure to squeeze the strips together and form a substantially solid metal strip whose cross section is shown in FIG. 8. As shown by FIG. 8, the pressure will deform the relatively soft copper or aluminum strips of material around the relatively hard wire 31 so that the two strips abut each other between the convolutions of the wire.

Since the strip thus formed is to be bonded into a solid piece, it will be desirable to apply a bonding or brazing compound which may be done by brushes 35 and 36 supplied with a source of the compound and held against the upper surfaces of the respective strips 28 and 29.

After the strips and wire are thus rolled up and squeezed together, the roll thus formed on the arbor is preferably put into an oven or furnace such as an induction furnace to heat the disc to bond the two strips and the embedded wire all together into a solid piece. There will thus be made a rotor disc of the desired dimensions in which wire or rods of magnetic material extend transversely across and through the solid non-magnetic but electrically conductive material. It will be understood, of course, that an inner region near the hub may be formed of the strips without the presence of any wire and likewise an outer peripheral portion may be left without the presence of any magnetic wire.

It will usually be desirable to fabricate the loops 32 of the wire where they protrude beyond the strips to present a flat surface of maximum area to the juxtaposed stator face. This is shown in FIGURE 12 at 32a.

FIG. 9 illustrates another manner of building a rotor disc for the induction machine. In this case a large number of wires 37 of magnetic material, which can be like the wire 31 of FIG. 7, are pulled through holes 38 formed through the bottom part of a hopper 39, at one end of the hopper, and out through an opening 40 at the other end of the hopper. Molten non-magnetic metal, such as aluminum or copper, is poured into the open top of the hopper so that it embeds the many wires 37 passing through the bottom of the hopper, these wires 37 being held slightly apart by the spacing of the holes 38 and the fact that each wire is passed through the hopper parallel to all the other wires.

As the molten metal congeals around the wires, the wires with this congealed metal are continuously extruded through the hole 40, which will provide a cylindrical billet 41 with the wires 37 embedded in it and spaced from each other in the desired manner.

A suitable rotary cut-off saw 42 mounted on a saw shaft 43 is caused to saw transversely through the billet at spaced positions equal to the desired width of the rotor disc, so that each sawed off piece constitutes a rotor disc.

For the purpose of providing the desired hub openings, there is passed through the hopper and centrally located within the multitude of wires, a suitable mandril which can be removed after the billets are cut by the saw.

The induction machine can be made to operate as a generator in a well known manner by applying torque to the shaft and taking the generated alternating voltage at the stator winding.

The expression "disc" as used in this specification and the claims means an element which can be mounted for rotation and presents a face substantially normal to the axis of rotation so as to form an axial air gap with a stator armature element. The expression "disc" covers an element which is circular in its face view, and also covers such an element even though it should not happen to be precisely circular in its face view.

The expression "axial air gap" as used in this specification and in the claims means the small space or gap between a face or rod ending of the rotor disc lying in a plane substantially normal to the axis of rotation and the face or surface of the stator armature core which is juxtaposed and substantially parallel to said disc face.

The magnetic material of the rotor can be made of such magnetic materials as pure iron, REMA iron, Supermendur (an alloy of vanadium, iron and cobalt), 2V-permendur (an alloy of 2% vanadium, 49% iron and 49% cobalt, by weight), and the like, all of which are easily cast and machinable. The non-magnetic materials of the rotor can be of non-magnetic stainless steel, aluminum, brass, or "Cupaloy" or the like; although it should be all or at least in part of electrically conducting material. ("Cupaloy" is a trademark for a nearly pure copper alloyed with small amounts of silver and chromium.) Such a copper alloy can be cast in most conventional shapes with a casting technique which causes it to bond with the magnetic materials of the rotor.

Some of the advantages of the disc type induction machine according to this invention are as follows:

Disc type induction motors can be of less bulk and weight than conventional induction motors of comparable performance. The weight of a disc type induction motor according to the present invention may be as much as 30 to 40% less than that of a conventional motor, because, in the present invention, inactive back iron in the rotor is eliminated. Attendant advantages of the induction motor according to the present invention are its higher efficiency and higher power factor and lower starting current for a given starting torque, as compared with a conventional type induction motor. Furthermore, harmonic losses and "cogging" can be minimized by "tuning," that is, displacing stators or rotors with respect to each other so that harmonic fluxes tend to cancel. As shown in FIG. 2, slots 50 are provided to permit rotary adjustment of one stator with respect to the other to accomplish this.

The invention is not limited to the specific embodiment illustrated and described herein, as modifications hereof within the scope of the invention may suggest themselves to those skilled in the art. The invention is not limited except in accordance with the scope of the appended claims.

What is claimed is:

1. A rotor disc for mounting on the shaft of a dynamo-electric machine comprising a pair of strips of non-magnetic electrically conducting material rolled in a spiral with parallel lengths of wire of magnetic material extending transversely across and embedded between the strips, and the strips and wire being fused together to form a solid disc.

2. A rotor disc for mounting on the shaft of a dynamo-electric machine comprising a pair of strips of non-magnetic electrically conducting metal rolled in a spiral with a length of wire of magnetic material looped back and forth forming parallel lengths of the wire transversely across the strips with adjacent lengths close to but not touching each other, the wire being embedded between the strips, and the strips and wire being fused together to form a solid disc.

References Cited by the Examiner

UNITED STATES PATENTS

| | | | |
|---|---|---|---|
| 2,550,571 | 4/1951 | Litman | 310—268 X |
| 2,617,052 | 11/1952 | Bessiere | 310—268 X |
| 2,734,140 | 2/1956 | Parker | 310—268 |
| 2,872,604 | 2/1959 | Speth | 310—166 |
| 2,880,335 | 3/1959 | Dexter | 310—268 X |

ORIS L. RADER, *Primary Examiner.*

MILTON O. HIRSHFIELD, *Examiner.*

D. F. DUGGAN, *Assistant Examiner.*